United States Patent [19]

Eddens et al.

[11] Patent Number: 4,576,654
[45] Date of Patent: Mar. 18, 1986

[54] HEAT TREATED TUBE

[75] Inventors: Fletcher C. Eddens; David W. White; John L. Harmon, all of Wilmington, N.C.

[73] Assignee: General Electric Company, San Jose, Calif.

[21] Appl. No.: 438,515

[22] Filed: Nov. 1, 1982

Related U.S. Application Data

[63] Continuation-in-part of Ser. No. 368,715, Apr. 15, 1982, abandoned.

[51] Int. Cl.⁴ ............................................. C22F 1/18
[52] U.S. Cl. ............................... 148/11.5 F; 148/133
[58] Field of Search .................... 148/407, 421, 11.5 F, 148/12.7 B, 133, 39, 11.5 Q

[56] References Cited

U.S. PATENT DOCUMENTS 3,865,635 2/1975 Hofvenstam .................. 148/11.5 F
4,229,235 10/1980 Matsuda et al. .................. 148/154
4,238,251 12/1980 Williams et al. .................. 148/133
4,279,667 7/1981 Anthony et al. .................... 148/39
4,372,817 2/1983 Armijo et al. ...................... 376/417

FOREIGN PATENT DOCUMENTS 932336 7/1963 United Kingdom .
1537930 1/1979 United Kingdom .
2041973 9/1980 United Kingdom .
2045284 10/1980 United Kingdom .

Primary Examiner—Peter K. Skiff
Attorney, Agent, or Firm—Ivor J. James, Jr.; Samuel E. Turner; Raymond G. Simkins

[57] ABSTRACT

There is provided a nuclear fuel element having a zirconium alloy cladding tube with improved corrosion resistance. The cladding tube comprises a metallurgical gradient across the width of the tube wall wherein the tube has a more corrosion-resistant metallurgical condition at the outer circumference and a less corrosion-resistant metallurgical condition at the inner circumference. The metallurgical gradient can be generated by heating an outer circumferential portion of the tube to the high alpha or mixed alpha plus beta range while maintaining the inner surface at a lower temperature, followed by cooling of the tube.

40 Claims, 5 Drawing Figures

HEAT TREATED TUBE

CROSS REFERENCE TO RELATED APPLICATION

This is a continuation-in-part of application Ser. No. 368,715, filed April 15, 1982, abandoned.

FIELD OF THE INVENTION

This invention relates broadly to an improvement in nuclear fuel elements in the core of nuclear fission reactors and, more particularly, to an improved nuclear fuel element having a cladding container comprising a metallurgical gradient across the wall of the container.

BACKGROUND OF THE INVENTION

Nuclear reactors are presently being designed, constructed, and operated in which the nuclear fuel is contained in fuel elements which have various geometric shapes, such as plates, tubes, or rods. The fuel material is usually enclosed in a corrosion-resistant, nonreactive, heat-conductive container, or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core, in turn, is enclosed within a reactor vessel through which a coolant is passed.

The cladding serves several purposes, and two primary purposes are: first, to prevent contact and chemical reaction between the nuclear fuel and the coolant or the moderator, if a moderator is present, or both, if both the coolant and the moderator are present; and second, to prevent the radioactive fission products, some of which are gases, from being released from the fuel into the coolant or the moderator, or both, if the coolant and the moderator are present. Common cladding materials are stainless steel, aluminum and its alloys, zirconium and its alloys, niobium, certain magnesium alloys, and others. The failure of the cladding, i.e., a loss of the leak-tightness, can contaminate the coolant or moderator and the associated systems with radioactive, long-lived products to a degree which interferes with the plant operation.

The important requirements for materials used in nuclear reactor construction include low absorption for thermal neutrons, corrosion resistance, high ductility and mechanical strength. Zirconium-based alloys sufficiently satisfy these requirements and they are widely used for such purposes, "Zircaloy-2" and "Zircaloy-4" being two of the important commercial alloys commonly finding such use. These alloys exhibit corrosion under normal boiling water reactor operating conditions, resulting in the spalling of thick oxides from channels and the thickening of oxides on fuel rods. The spalling of oxide flakes leads, in some instances, to development of high-radiation fields in the vicinity of control rod mechanisms where the flakes collect; and the presence of thick oxide layers reduces heat-transfer efficiency and can result in local overheating of fuel cladding.

There is a desire to improve corrosion resistance of zirconium-based alloys to high-temperature water and steam without sacrificing other properties of the tubes made from such alloys. Differences in corrosive resistance between the inner circumference and outer circumference of a cladding tube can be provided by way of composition gradients. For example, corrosion resistance at one surface can be enhanced by plating or otherwise forming a composite structure. Such techniques can be costly and it is desirable to form a tube of uniform composition with improved corrosion resistance.

SUMMARY OF THE INVENTION

In accordance with the present invention, there is provided a particularly effective nuclear fuel element cladding tube for use in nuclear reactors wherein the metallurgy across the wall of the cladding tube comprises a metallurgical gradient.

The metallurgical gradient comprises a less corrosion-resistant metallurgical condition nearer the inner circumference of the tube and a more corrosion-resistant metallurgical condition nearer the outer circumference.

There is further provided a process for generating such a metallurgical gradient across the wall of the zirconium alloy cladding tube which comprises uniformly heating the exterior of the tube, which initially has a generally less corrosion-resistant metallurgical condition, to at least the high alpha range for a time sufficient to transform the exterior of the tube to a more corrosion-resistant metallurgical condition. Simultaneous to the exterior being heated, the interior is maintained at a temperature wherein essentially no metallurgical change occurs and wherein essentially no oxidation of the inner surface occurs.

When the heating of the exterior has been terminated, the tube is cooled sufficiently rapidly to maintain the corrosion-resistant metallurgical condition at the outer circumference. The heating and cooling of the exterior of the tube is preferably done in the presence of an inert fluid to prevent the formation of oxides on the exterior surface of the tube.

BRIEF DESCRIPTION OF THE DRAWINGS

These and other features and advantages of the present invention will be better understood by reference to the following detailed description when considered in conjunction with the accompanying drawings wherein.

DESCRIPTION OF THE INVENTION

Figure 1:
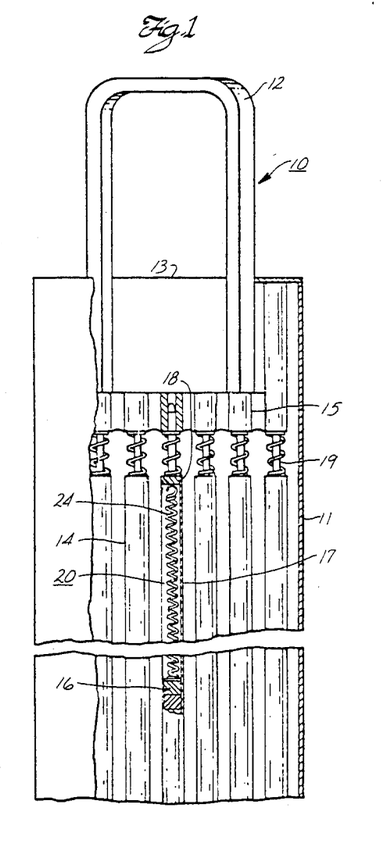
FIG. 1 is a partial cutaway sectional view of a nuclear fuel assembly containing nuclear fuel elements constructed according to principles of this invention.

A primary application of principles of this invention is in the fabrication of nuclear fuel assemblies such as that illustrated in a partially cutaway sectional view of FIG. 1. Fuel assembly 10 is typical of a boiling water reactor fuel assembly and consists of a tubular flow channel 11 of generally square cross-section provided at its upper end with a lifting bail 12 and at its lower end with a conventional nose place (not shown due to the lower portion of assembly 10 being omitted). The upper end of the channel 11 is open at an outlet 13 and the lower end of the nose piece is provided with coolant flow openings. An array of fuel elements or rods 14 containing the nuclear fuel material is enclosed in the channel 11 and supported therein by means of an upper end plate 15 and a lower end plate (not shown). A liquid coolant ordinarily enters through the openings in the lower end of the nose piece, passes upwardly around the fuel elements 14, and discharges through the upper outlet 13 at an elevated temperature in a partially vaporized condition for boiling reactors or in an unvaporized condition for pressurized reactors.

The nuclear fuel elements or rods 14 are sealed at their ends by means of end plugs 18 welded to the cladding 17, and may include studs 19 to facilitate the mounting of the fuel rod in the assembly. A void space or plenum 20 is provided at one end of the element to permit longitudinal expansion of the fuel material and accumulation of gases released from the fuel material. A nuclear fuel material retainer means 24 in the form of a helical spring member is positioned within the space 20 to provide restraint against the axial movement of the nuclear fuel material, especially during handling and transportation of the fuel element.

The fuel element is designed to provide an excellent thermal contact between the cladding and the fuel material, a minimum of neutron absorption and resistance to bowing and vibration occasionally caused by the flow of coolant at high velocity.

A nuclear fuel element or rod 14 constructed according to principles of this invention is shown in a partial section in FIG. 1. The fuel element includes a core or column of nuclear fuel material 16, here shown as a plurality of fuel pellets of fissionable and/or fertile material disposed within a structural cladding tube or container 17. In some cases, the fuel pellets may be of various shapes such as cylindrical pellets or spheres and, in other cases, different fuel forms such as a particulate fuel may be used. The physical form of the fuel is immaterial to this invention. Various nuclear fuel materials may be used including uranium compounds, plutonium compounds, thorium compounds, and mixtures thereof. A preferred fuel is uranium dioxide or a mixture comprising uranium dioxide and plutonium dioxide.

Figure 2:
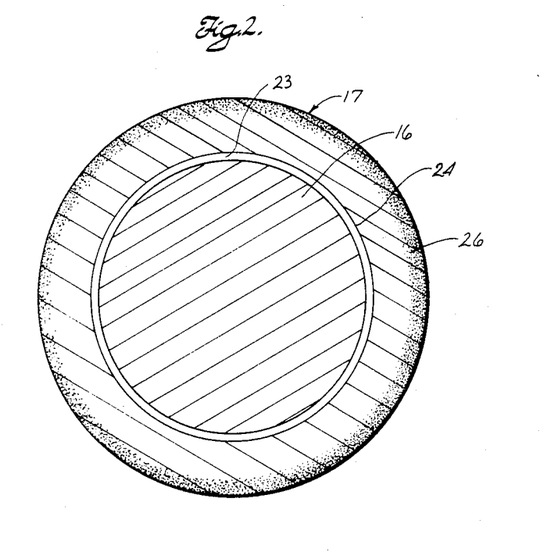
FIG. 2 is a transverse cross-sectional view of a nuclear fuel element with an exaggerated cladding tube wall illustrating a preferred embodiment according to principles of this invention.

Referring now to FIG. 2, the nuclear fuel material 16 forming the central core of the fuel element 14 is surrounded by a cladding tube 17. The cladding tube encloses the fissile core so as to leave a gap 23 between the core and the cladding tube during use in a nuclear reactor. FIG. 2 is not drawn to scale, the wall thicknesses of the gap 23 and tube 17 being exaggerated for purposes of illustration. The cladding tube is constructed of a zirconium alloy. It is preferred that the cladding tube be constructed of Zircaloy-2 or Zircaloy-4. Zircaloy-2 has, on a weight basis, about 1.5% tin; 0.12% iron; 0.09% chromium; 0.005% nickel and 0.1% oxygen. Zircaloy-4 contains essentially no nickel and about 0.2% iron but is otherwise substantially similar to Zircaloy-2.

Zirconium alloys typically comprise an intermetallic particulate phase. As indicated above, the preferred zirconium alloys contain tin, iron and chromium and may additionally contain nickel. The preferred zirconium alloys contain the intermetallic compound $Zr(Cr,Fe)_2$, and may contain $Zr_2(Ni,Fe)$, in the form of a particulate precipitate.

Pure zirconium exhibits two distinct crystal lattice structures or phases, alpha and beta, that are stable in different temperature ranges. In addition, alloys of zirconium, such as Zircaloy-2 and Zircaloy-4, display a stable mixture of two crystal lattice structures in a third intermediate temperature range.

As used herein, the term "alpha crystalline structure" or "alpha phase" means the close-packed hexagonal crystal lattice structure that is stable at lower temperatures. The temperature range in which the alpha phase is stable is referred to as the alpha range.

As used herein, the term "beta crystalline structure" or "beta phase" means the body-centered cubic crystal lattice structure stable at higher temperatures. The temperature range in which the beta phase is stable is referred to as the beta range.

In pure zirconium, the alpha crystalline structure is stable up to about 1580° F. At about this temperature a phase change occurs to form beta crystalline structure which is stable at temperatures above about 1580° F. Zirconium alloys have a temperature range around the phase change temperature of pure zirconium wherein a mixture of alpha and beta crystalline structure is stable. The specific temperature range wherein the mixture is stable depends on the specific alloy. For example, Zircaloy-2 exhibits a stable mixture of alpha plus beta crystalline structures from about 1490° F. to about 1780° F.

The cladding tube or container comprises a metallurgical gradient across its wall comprising a less corrosion-resistant metallurgical condition at the inner circumference 24 and a more corrosion-resistant metallurgical condition at the outer circumference 26.

Usually, the intermetallic particulate phase of the portions of the tube having a less corrosion-resistant metallurgical condition is in a generally uniform configuration and the intermetallic particulate phase of the more corrosion-resistant portions is at least partially segregated, e.g., into two dimensional arrays. However, metallurgical gradients have been observed having no detectable difference in the configuration of the precipitate phase of the more corrosion-resistant metallurgical condition and the less corrosion-resistant metallurgical condition.

The invention further provides a process for producing zirconium alloy cladding tubes comprising metallurgical gradients as described above. The process starts with the formation of a cladding tube generally in a less corrosion-resistant metallurgical condition. This is the most stable condition of the alpha phase and is typical of tubes that have not been heated to a temperature wherein the more corrosion-resistant properties are exhibited.

The exterior of the tube is heated to a temperature sufficient to transform the exterior into a more corrosion-resistant metallurgical condition. It is presently preferred that the exterior of the tube be heated to the high alpha range or mixed alpha plus beta range.

It has been found that a "high alpha" temperature range exists in which the alpha phase is stable wherein zirconium alloys heated to this range are transformed into the more corrosion-resistant metallurgical condition. Zirconium alloys heated to the high alpha range and then quenched sufficiently fast to maintain the more corrosion-resistant metallurgical condition exhibit enhanced corrosion-resistant properties. For the preferred zirconium alloys, this range is from about 1300° F. to the temperature at which the alloy undergoes a phase change from alpha to a mixed alpha plus beta phase.

The upper limit of the temperature range is preferred to be the upper limit at which the mixed alpha plus beta phase is stable. Heating in the beta range, while producing the favorable more corrosion-resistant metallurgical condition, reduces the ductility of the tube in addition to requiring more energy and time to heat and cool the tube. A heat treatment in the high alpha or mixed alpha plus beta range rather than in the beta range has been found to affect the ductility of the zirconium alloy much less. The invention as described, however, can be carried out by heating the outer portion of the tube to temperatures ranging from the high alpha range from about 1300° F., to the beta range from about 1800° F. and higher.

While the exterior of the tube is heated, the interior surface is maintained at a temperature sufficiently low to retain a less corrosion-resistant metallurgical condition and to prevent oxide formation by passing a coolant through the tube. A coolant must be used, especially for thin-walled tubes, e.g., tubes having a wall thickness less than about one inch, because zirconium alloys have a high thermal conductivity and in practice heat cannot be applied and removed to the exterior fast enough not to heat the interior portions of the tube to an undesirable temperature.

It is preferred that the inner surface temperature not exceed about 800° F. Above about 800° F., oxide formation on the inner surface can occur. It is more preferred that the temperature does not exceed about 210° F. An inner surface temperature of about 210° F. or less allows the use of ambient pressure water as coolant without substantial formation of steam within the tube.

After the exterior of the tube has been heated sufficiently to transform the alloy into a more corrosion-resistant metallurgical condition, the tube is cooled sufficiently rapidly to prevent substantial transformation into the less corrosion-resistant metallurgical condition. This produces a tube having a transformed high alpha or transformed mixed alpha plus beta crystalline structure at the exterior of the tube.

The portion of a zirconium alloy tube that has been heated to the high alpha range for a time sufficient to transform that portion of the tube into a more corrosion-resistant metallurgical condition and subsequently cooled to prevent substantial transformation back into the less favorable metallurgical condition is herein referred to as "transformed high alpha" crystalline structure.

Likewise, the portion of a zirconium alloy tube that has been heated to a temperature sufficient to effect a phase change from the alpha to the mixed alpha plus beta phase and subsequently cooled is herein referred to as "transformed alpha plus beta" crystalline structure.

It is also preferred that the above-described heat treatment be done in the presence of an inert fluid to prevent the formation of oxides on the exterior of the tube.

Figure 3:
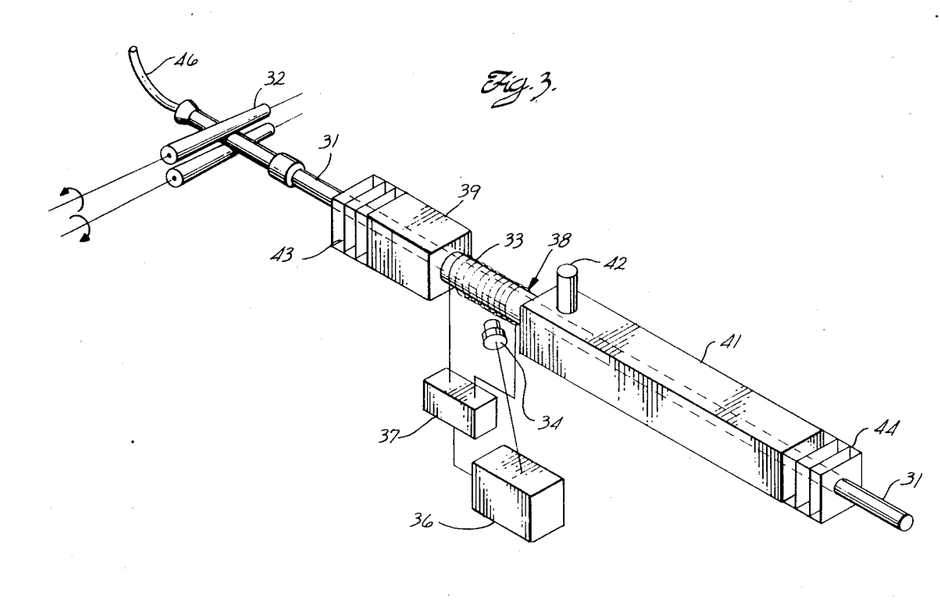
FIG. 3 is an isometric view of an apparatus for heat treating cladding tubes according to principles of this invention.

With reference to FIG. 3, a preferred process of generating a metallurgical gradient as described above is by uniformly heating a circumferential portion of the exterior of the cladding tube 31 to at least the high alpha range, above about 1300° F. for the preferred zirconium alloys, while maintaining the inner circumference surface below about 800° F. and preferably below about 210° F. The cladding tube 31 is mechanically coupled to a means for advancing the tube, for example rollers 32, through an induction coil 33. The tube is advanced at a constant linear rate of travel to provide uniform distribution of heat to the tube. The preferred rate is about 4 to 30 or more inches per minute. The rate is adjusted to provide sufficient time within the induction coil for the tube to acquire the amount of heat to transform the outer circumferential portion of the tube into a more corrosion-resistant metallurgical condition.

Heat is generated from the induction coil which is energized with alternating current of frequencies typically ranging from 3,000 to 50,000 Hz. The power used is sufficient to generate the required amount of heat. A zone of the tube within the induction coil is heated to a temperature sufficient to effect a transformation of the metallurgy at the outer surface into a more corrosion-resistant condition.

The extent or depth of the more corrosion-resistant metallurgy depends on the time and temperature of the tube within the induction coil. The temperature is dependent on the power input to the coil. A radiation pyrometer 34 senses the exterior temperature of the heated zone of the tube through a standard electronic feedback control system 36 and the matching station 37 limits and controls the temperature to a selected value by governing the power input to the coil.

Oxide formation on the exterior of the cladding tube is minimized by enveloping the hot zone within the induction coil and surrounding environment with an inert fluid such as helium, disposed in a quartz tube 38 joined to inlet box 39 and outlet box 41. The inert gas is introduced to the outlet box 41 through a pipe 42 and a slight positive gas pressure is maintained inside the hot zone quartz tube by resistance to exit gas flow by an inlet gland 43 and an outlet gland 44 through which the tube enters and exits the apparatus.

The interior surface of the tube is cooled by passing a coolant through a flexible line 46 into and through the tube while the exterior is being heated. The preferred coolant is water. The flowing coolant in contact with the inside surface of the tube maintains the inner portions of the tube in a less corrosion-resistant metallurgical condition. The inside surface of the tube does not undergo chemical reaction or oxidation during the heat treatment due to its lower temperature. When the heated zone of the tube advances past the induction coil and there is no longer any energy entering that part of the tube to heat it, the water flowing through the inside of the tube rapidly cools the outer portion of the tube by conduction through the tube wall. The cooling is sufficiently rapid to maintain the more corrosion-resistant metallurgical condition generated in the induction coil.

Figure 4:
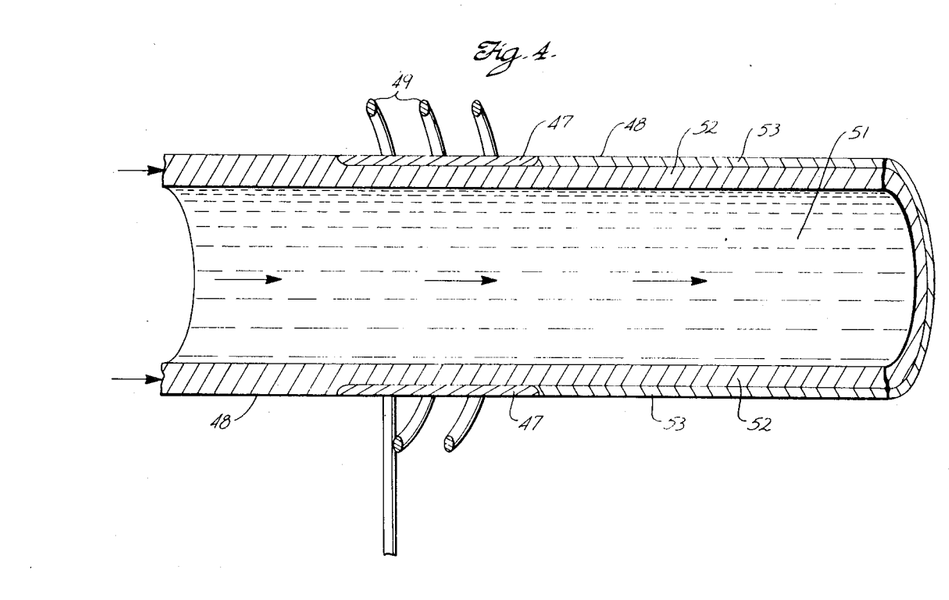
FIG. 4 is a fragmentary cross-sectional view of a cladding tube in the heating zone of the apparatus shown in FIG. 3.

With reference to FIG. 4, the portion of the tube passing through the induction coil is shown in cross-section. A hot zone 47 of the tube 48 is created inside the induction coil 49 as the tube is advanced. Water 51 flowing through the interior of the tube cools the inner portions 52 of the tube which remain unaffected by the heat. As the tube advances, the outer portion 53 of the tube that has been heated in the induction coil is cooled by thermal conductivity, with heat being transferred to the water flowing through the interior of the tube. This generates a metallurgical gradient wherein the outer portion 53 of the tube has been transformed by the heat treatment into a more corrosion-resistant metallurgical condition and the inner portion 52 has been unaffected by the heat treatment. The inner portion 52 and outer portion 53 of the tube are depicted as two distinct layers but the metallurgy actually exhibits a gradual change in corrosion-resistant properties.

Heating the tube by induction is the preferred method; however, there are numerous other rapid heating methods that accomplish the desired result. For example, the entire tube may be heated to the desired temperature range, i.e., at least to the high alpha range, by passing an electrical current from one end of the tube to the other. This can be accomplished by using a ring or circular electrical contact at each end. The electrical current is adjusted to be sufficient to heat the tube by its resistance to the current. Coolant flowing through the tube cools the inner surface of the tube sufficiently to prevent oxide formation and to cool the entire tube sufficiently rapidly, after the current is removed, to retain the more corrosion-resistant metallurgical condition generated by the heat treatment. This heat treatment process may also be carried out in an inert atmosphere to prevent the formation of oxides on the exterior surface of the tube.

The desired metallurgical gradient may also be generated by heating the tube in a furnace while coolant is flowing through the tube interior. However, this method makes the prevention of oxide formation on the exterior of the tube more difficult.

The heat treatment, according to the present invention, may be carried out during any stage in tube reduction. The present process is particularly useful for treating the final product which may undergo the heat treatment without undergoing significant distortion. However, it is presently preferred that the heat treatment take place prior to the final cold-work reduction. This provides a tube with a greater wall thickness which allows the exterior of the tube to be heated to the desired temperature with less energy because heat is removed by conduction through the wall slower than in a tube having a lesser wall thickness. Any cold-work reductions that occur after the heat treatment cause the metallurgical characteristics of the wall of the cladding tube to reduce proportionately but do not significantly reduce the beneficial effects attained with this heat treatment.

The more corrosion-resistant metallurgical condition of the tube is more resistant to oxidation in hot water and steam environments than the less corrosion-resistant metallurgical condition. By utilizing the above process, a cladding tube can be generated which comprises the more corrosion-resistant metallurgical condition at the exterior of the tube which is the only portion that typically contacts steam and hot water while maintaining the desirable mechanical properties, i.e., higher ductility, throughout the entire tube.

EXAMPLE 1

A tube shell of Zircaloy-2, about 2.5 inches in diameter, about 6 feet long and having a wall thickness of about 0.430 inches was placed in a four-turn induction coil. Water was passed through the interior of the tube shell at a rate of about five gallons per minute. The induction coil was energized by a 200 kilowatt, 3000 Hz power source with appropriate matching transformer.

The exterior of the tube shell within the induction coil was allowed to increase in temperature to about 1650° F. in about 22 seconds. The exterior temperature of the tube shell was held at about 1650° F. for about 8 seconds. The power was then cut off and the tube shell, with water flowing through its interior, was allowed to cool to about 400° F. in about 21 seconds.

The heat-treated tube shell was then reduced in a Pilger mill in three successive passes to a final cladding tube having about 0.483 inches outside diameter and a wall thickness of about 0.032 inches. After each reduction pass, the tube was annealed at about 1150° F. for about 2 hours.

The tube shell was then steam corrosion tested at about 932° F. for about 24 hours. The corrosion weight gain for the portion of the tube given the heat treatment was about one-fourth of the weight gain exhibited by the non-heat-treated portion of the tube.

Since the interior portion of the tube unit is retained at relatively low temperatures throughout the application of this invention whereby there are no significant changes in that area, the invention is applicable to tube units having various internal components such as coatings or linings providing an inner barrier for resisting fission products and other effects of service as a fuel container in a nuclear reactor. Tubes for nuclear fuel cladding which are amenable to this invention comprise those having zirconium metal barriers such as disclosed in U.S. Pat. No. 4,200,492, as well as those with copper and other metal liners, including composite liners, for example the units disclosed in U.S. Pat. Nos. 3,969,186; 3,925,151; 4,022,662; 4,045,288; and 4,316,771.

Figure 5:
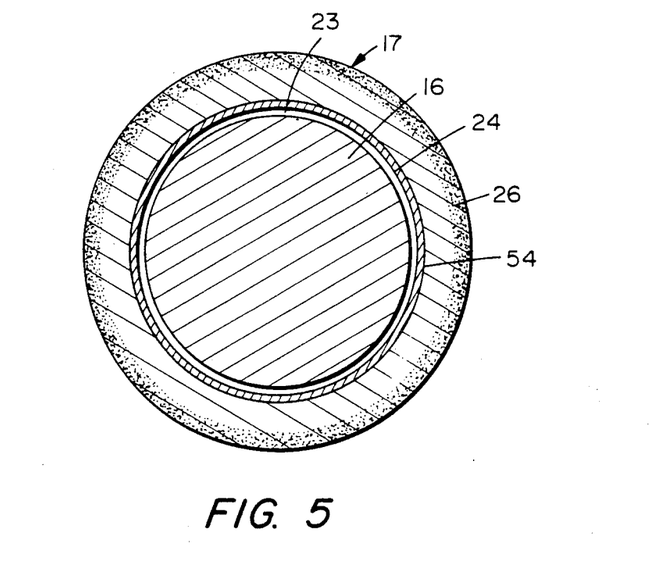
FIG. 5 is a transverse cross-sectional view of a nuclear fuel element with a cladding tube having a barrier lining which has been produced according to principles of this invention.

In FIG. 5 of the drawings there is shown a barrier lined tube treated in accordance with this invention. In this embodiment the cladding tube or container 17 for fuel 16 includes a liner 54 bonded over the inner circumference or surface 24 in addition to being provided with an outer circumference area 26 having a more corrosion-resistant metallurgical condition. The liner 54 can be composed of zirconium or other metals heretofore used as barriers in this art.

What is claimed is:

1. A process for producing a zirconuim alloy tube having a metallurgical gradient having a less corrosion-resistant metallurgical condition at the inner circumference of the tube and a more corrosion-resistant metallurgical condition at the outer circumference of the tube comprising:

forming a zirconium alloy tube having said less corrosion-resistant metallurgical condition;

heating an outer circumferential portion of the tube to the high alpha range, or mixed alpha plus beta range for a time sufficient to transform the outer circumferential portion of the tube to said more corrosion-resistant metallurgical condition while cooling to maintain the inner circumferential portion of the tube at a temperature sufficiently low that essentially no metallurgical change occurs at the inner surface;

cooling the tube sufficiently rapidly to retain said more corrosion-resistant metallurgical condition at the outer circumference portion; and reducing the diameter of the thus heat treated tube with multiple cold working reduction passes in a reduction mill.

2. A process according to claim 1 wherein the less corrosion-resistant metallurgical condition comprises a substantially uniform distribution of the intermetallic particulate phase.

3. A process according to claim 1 wherein the more corrosion-resistant metallurgical condition comprises at least a partially segregated distribution of the intermetallic particulate phase.

4. A process according to claim 1 wherein the outer circumferential portion of the tube is heated at least to about 1300° F.

5. A process according to claim 1 wherein the outer circumferential portion of the tube is heated by passing the tube through an induction coil energized with sufficient alternating current to heat the outer circumferential portion of the tube to a temperature wherein the outer circumferential portion of the tube is transformed to a more corrosion-resistant metallurgical condition.

6. A process according to claim 1 wherein an outer circumferential portion of the tube is heated by passing a substantially uniform electric current through the tube, the electric current being sufficient to heat the outer circumferential portion of the tube to a temperature wherein the outer circumferential portion of the tube is transformed to a more corrosion-resistant metallurgical condition.

7. A process according to claim 1 wherein the inner circumferential portion of the tube is cooled by continuously passing coolant through the interior of the tube while the outer circumferential portion of the tube is heated.

8. A process according to claim 1 wherein the tube is cooled following heating by passing coolant through the interior of the tube.

9. A process as claimed in claim 1 further comprising preventing the formation of oxides on the outer circumferential surface of the tube during heating and cooling.

10. A process as claimed in claim 9 wherein the formation of oxides on the outer circumferential surface of the tube is prevented by heating and cooling the outer circumferential portion of the tube in the presence of an inert fluid.

11. A process as claimed in claim 1 wherein the temperature of the inner circumferential surface does not exceed about 800° F.

12. A process as claimed in claim 1 wherein the temperature of the inner circumferential surface does not exceed about 210° F.

13. The process of claim 1, wherein the heating of the outer circumferential portion of the tube is effected by advancing the tube at a substantially constant linear rate of travel through a heating coil, whereby said heating of the outer circumferential portion of the tube progresses in a specific circumferential area along the length of the tube with the movement of the tube through the heating coil.

14. A process for producing a zirconium alloy tube having a metallurgical gradient wherein the tube has a less corrosion-resistant metallurgical condition at the inner circumference of the tube and a more corrosion-resistant metallurgical condition at the outer circumference of the tube comprising:
forming a zirconium alloy tube generally having said less corrosion-resistant metallurgical condition;
heating an outer circumferential portion of the tube by passing the tube through an induction coil energized with sufficient alternating current to heat the outer circumferential portion of the tube to a temperature sufficient to transform the outer circumferential portion of the tube to said more corrosion-resistant metallurgical condition while passing coolant through the interior of the tube so that essentially no metallurgical change occurs at the inner surface and to prevent the formation of oxides on the inner surface;
cooling the tube sufficiently rapidly to maintain said more corrosion-resistant metallurgical condition at the outer circumference by continuing to pass coolant through the interior of the tube following heating; and
reducing the diameter of the thus heat treated tube with multiple cold working reduction passes in a reduction mill.

15. A process according to claim 14 wherein the outer circumferential portion is heated to a temperature in the high alpha range.

16. A process according to claim 15 wherein the outer circumferential portion of the tube is heated at least to about 1300° F.

17. A process according to claim 14 wherein the outer circumferential portion is heated to a temperature in the mixed alpha plus beta range.

18. A process according to claim 14 wherein the outer circumferential portion is heated to a temperature in the beta range.

19. A process according to claim 14 wherein the temperature of the inner circumferential surface does not exceed about 800° F.

20. A process as claimed in claim 14 wherein the temperature of the inner circumferential surface does not exceed about 210° F.

21. A process as claimed in claim 20 wherein the coolant is water.

22. A process as claimed in claim 14 further comprising preventing the formation of oxides on the outer circumferential surface of the tube during heating and cooling.

23. A process as claimed in claim 22 wherein the formation of oxides on the outer circumferential surface of the tube is prevented by heating and cooling the outer circumferential portion of the tube in the presence of an inert fluid.

24. A process for producing a zirconium alloy tube with a barrier liner of zirconium metal bonded to its inside surface and having a metallurgical gradient having a less corrosion-resistant metallurgical condition at the inner circumference of the tube and a more corrosion-resistant metallurgical condition at the outer circumference of the tube comprising:
forming a zirconium alloy tube with a zirconium metal barrier liner bonded to its inside surface having said less corrosion-resistant metallurgical condition;
heating an outer circumferential portion of the tube to the high alpha range, or mixed alpha plus beta range for a time sufficient to transform the outer circumferential portion of the tube to said more corrosion-resistant metallurgical condition while maintaining an inner circumferential portion of the tube at a temperature sufficiently low that essentially no metallurgical change occurs at the inner surface;
cooling the tube sufficiently rapidly to retain said more corrosion-resistant metallurgical condition at the outer circumference; and
reducing the diameter of the thus heat treated tube with multiple cold working reduction passes in a reduction mill.

25. The process of claim 24, wherein the heating of the outer circumferential portion of the tube is effected by advancing the tube at a substantially constant linear rate of travel through a heating coil, whereby said heating of the outer circumferential portion of the tube progresses in a specific circumferential area along the length of the tube with the movement of the tube through the heating coil.

26. A process for producing a zirconium alloy tube with a metallurgical gradient across the tube wall having a less corrosion-resistant metallurgical condition at the inner circumference portion of the tube wall and a more corrosion-resistant metallurgical condition at the outer circumference portion of the tube wall comprising:

forming a zirconidm alloy tube having said less corrosion-resistant metallurgical condition throughout its wall;

heating an outer circumferential portion of the tube wall to the high alpha range, or mixed alpha plus beta range for a time sufficient to transform the outer circumferential portion of the tube wall to said more corrosion-resistant metallurgical condition while cooling an inner circumferential portion of the tube wall to maintain it at a temperature sufficiently low that essentially no metallurgical change occurs at the inner surface portion;

cooling the tube sufficiently rapidly to retain said more corrosion-resistant metallurgical condition at the outer circumference portion; and reducing the diameter and wall thickness of said zirconium alloy tube having a metallurgical gradient across the wall of the tube with at least three successive passes of said tube through a reduction mill.

27. The process of claim 26, wherein the zirconium alloy tube is annealed between each reduction pass through a reduction mill.

28. The process of claim 26, wherein the zirconium alloy tube formed and heat treated has an initial diameter of about 2.5 inches and is reduced in diameter with the successive passes through a reduction mill to a diameter of about 0.4 inches.

29. The process of claim 26, wherein the heating of the outer circumferential portion of the tube is effected by advancing the tube at a substantially constant linear rate of travel through a heating coil, whereby said heating of the outer circumferential portion of the tube progresses in a specific circumferential area along the length of the tube with the movement of the tube through the heating coil.

30. A process for producing a zirconium alloy tube with a barrier liner of zirconium metal bonded to its inside surface and with a metallurgical gradient across the tube well having a less corrosion-resistant metallurgical condition at the inner circumference of the tube wall and a more corrosion-resistant metallurgical condition at the outer circumfetence of the tube wall comprising:

forming a zirconium alloy tube with a zirconium metal barrier liner bonded to its inside surface and having said less corrosion-resistant metallurgical condition throughout its wall;

heating an outer circumferential portion of the tube wall to the high alpha range, or mixed alpha plus beta range for a time sufficient to transform the outer circumferential portion of the tube wall to said more corrosion-resistant metallurgical condition while cooling an inner circumferential portion of the tube wall to maintain it at a temperature sufficiently low that essentially no metallurgical change occurs at the inner surface portion;

cooling the tube sufficiently rapidly to retain said more corrosion-resistant metallurgical condition at the outer circumference portion; and reducing the diameter and wall thickness of said zirconium alloy tube with bonded zirconium metal barrier liner having a metallurgical gradient across the wall of the tube with at least three successive passes of said tube through a reduction mill.

31. The process of claim 30, wherein the zirconium alloy tube with zirconium metal barrier liner is annealed between each reduction pass through a reduction mill.

32. The process of claim 30, wherein the zirconium alloy tube with zirconium metal barrier liner formed and heat treated has an initial diameter of about 2.5 inches and is reduced in diameter with the successive passes through a reduction mill to a diameter of about 0.4 inches.

33. The process of claim 30, wherein the heating of the outer circumferential portion of the tube is effected by advancing the tube at a substantially constant linear rate of travel through a heating coil, whereby said heating of the outer circumferential portion of the tube progresses in a specific circumferential area along the length of the tube with the movement of the tube through the heating coil.

34. A process for producing a tube of zirconium alloy with a metallurgical gradient across the tube wall having a less corrosion-resistant metallurgical condition at the inner circumference of the tube wall and a more corrosion-resistant metallurgical condition at the outer circumference of the tube wall comprising the sequence of steps of:

forming a zirconium alloy tube generally having said less corrosion-resistant metallurgical condition throughtout its wall;

heating an outer circumferential portion of the tube wall by passing the tube through an induction coil energized with sufficient alternating current to heat the outer circumferential portion of the tube wall to a temperature sufficient to transform the outer circumferential portion of the tube wall to said more corrosion-resistant metallurgical condition while passing coolant through the interior of the tube so that essentially no metallurgical change occurs an the inner surface portion of the tube wall and to prevent the formation of oxides on the inner surface;

cooling the tube sufficiently rapidly to maintain said more corrosion-resistant metallurgical condition at the outer circumference portion of the tube wall by continuing to pass coolant through the interior of the tube following heating; and reducing the diameter and wall thickness of said heat treated zirconium alloy tube having a metallurgical gradient across the wall of the tube with successive passes of said tube through a reduction mill.

35. The process of claim 34, wherein the reduction comprises at least three reducing passes through a reduction mill.

36. The process of claim 34, wherein the tube of zirconium alloy is annealed between each reduction pass through a reduction mill.

37. The process of claim 34, wherein the zirconium alloy tube formed and heat treated has an initial diameter of about 2.5 inches, and is reduced in diameter with the successive passes through a reduction mill to a diameter of about 0.4 inches.

38. The process of claim 34, wherein the zirconium alloy tube formed and heat treated has an initial wall thickness of about 0.430 inches, and is reduced in thickness with the successive passes through a reduction mill to a thickness of about 0.032 inches.

39. The process of claim 34, wherein the zirconium alloy tube comprises a liner of zirconium metal metallurgically bonded to its inner surface.

40. A process for producing a tube of zirconium alloy with a metallurgical gradient across the tube wall having a less corrosion-resistant metallurgical condition at the inner circumference of the tube wall and a more corrosion-resistant metallurgical condition at the outer circumference of the tube wall comprising the sequence of steps of:

forming a zirconium alloy tube generally having said less corrosion-resistant metallurgical condition throughout its wall;

heating an outer circumferential portion of the tube wall to a temperature sufficient to transform the outer circumferential portion of the tube wall to said more corrosion-resistant metallurgical condition by applying heat to a specific circumferential area of the tube traveling along the length of the tube at a substantially constant linear rate of travel, while passing coolant through the interior of the tube so that essentially no metallurgical change occurs at the inner surface portion of the tube wall and to prevent the formation of oxides in the inner surface;

cooling the tube sufficiently rapidly to maintain said more corrosion-resistant metallurgical condition at the outer circumference portion of the tube wall by continuing to pass coolant through the interior of the tube following heating; and reducing the diameter and wall thickness of said heat treated zirconium alloy tube having a metallurgical gradient across the wall of the tube with successive passes of said tube through a reduction mill.

* * * * *